INVENTORS
John C. Wooley and
Otto N. Gredell.
BY Arthur C. Brown
ATTORNEY

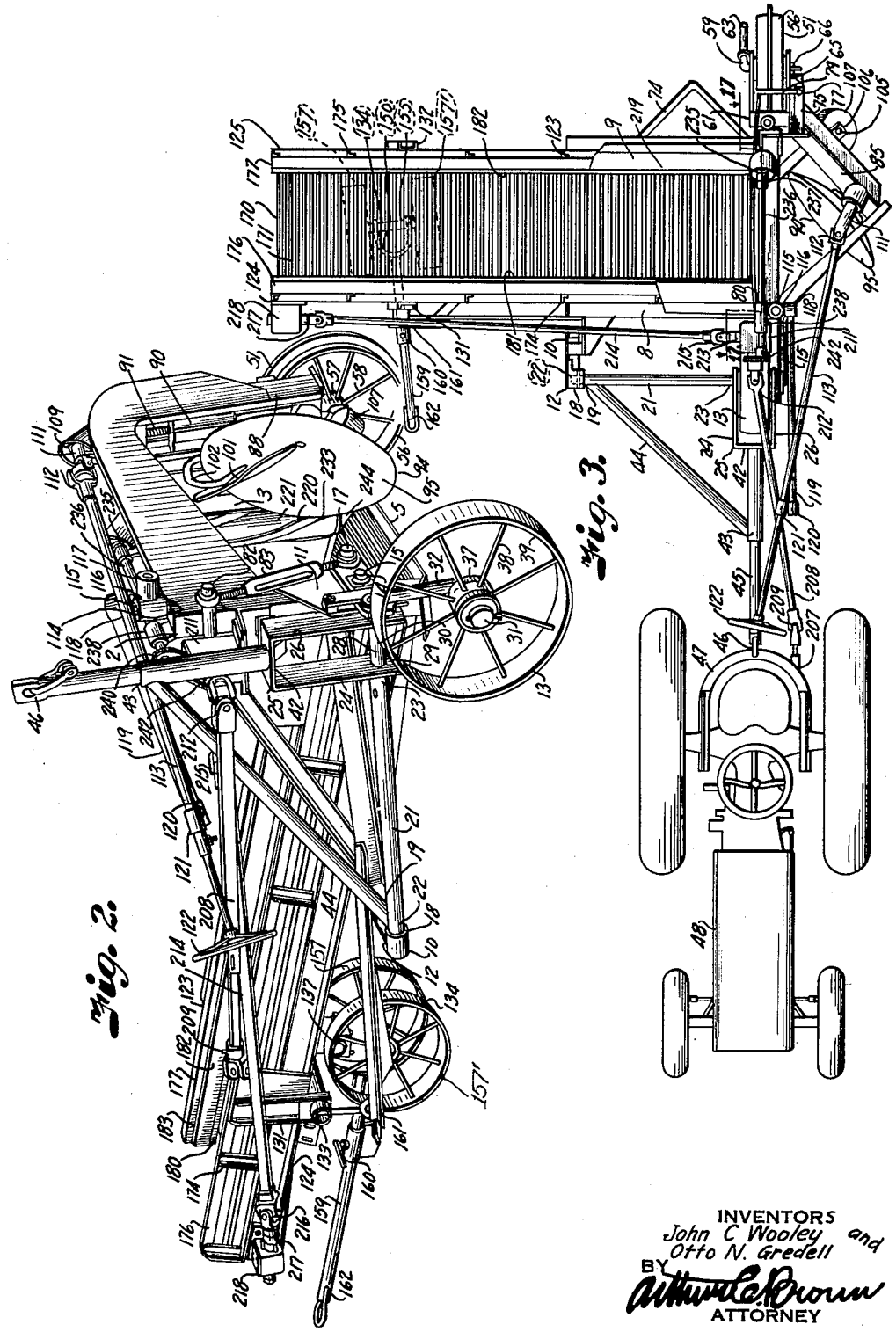

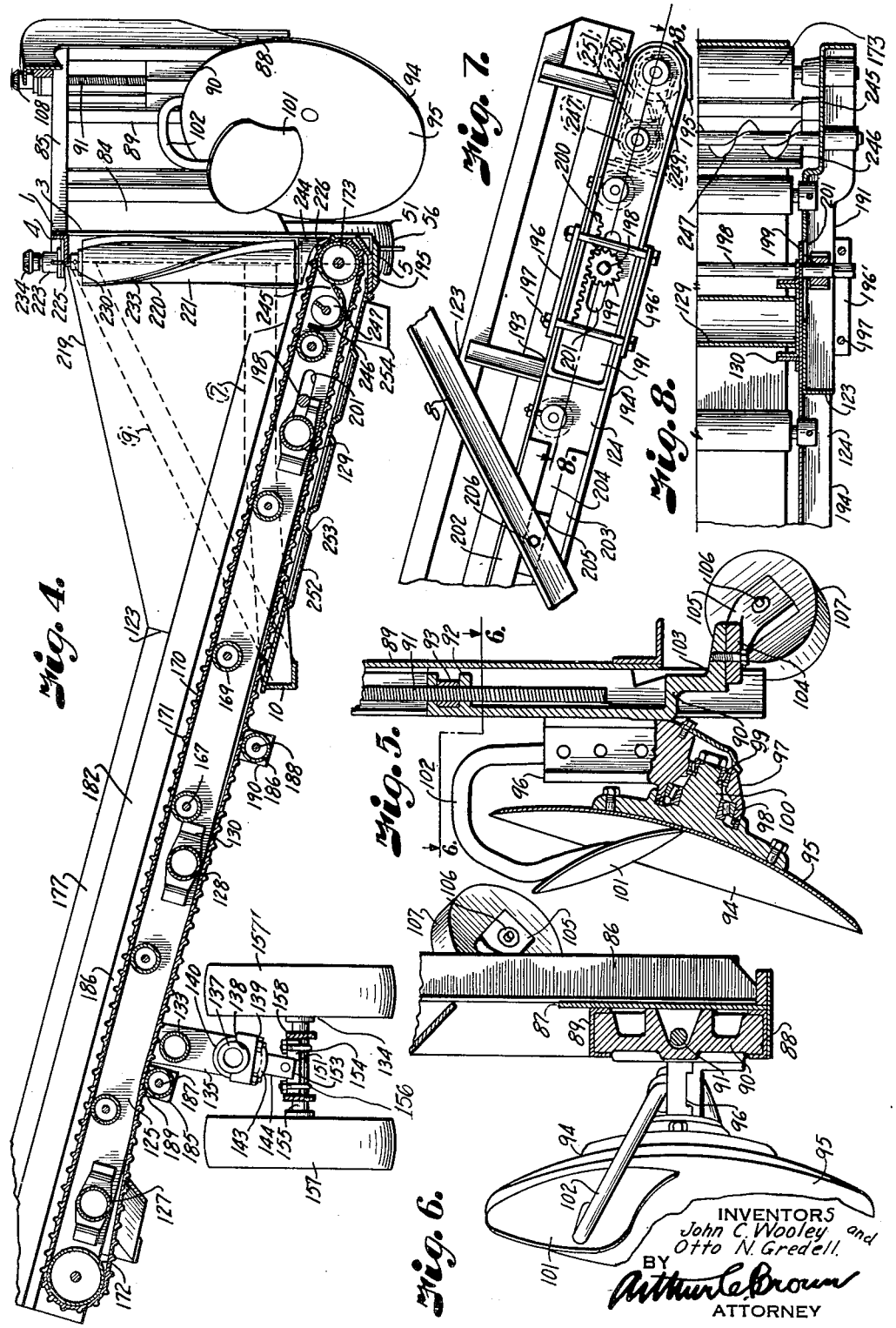

Aug. 10, 1937.  J. C. WOOLEY ET AL  2,089,319
GRADING MACHINE
Filed Nov. 12, 1934  6 Sheets-Sheet 4
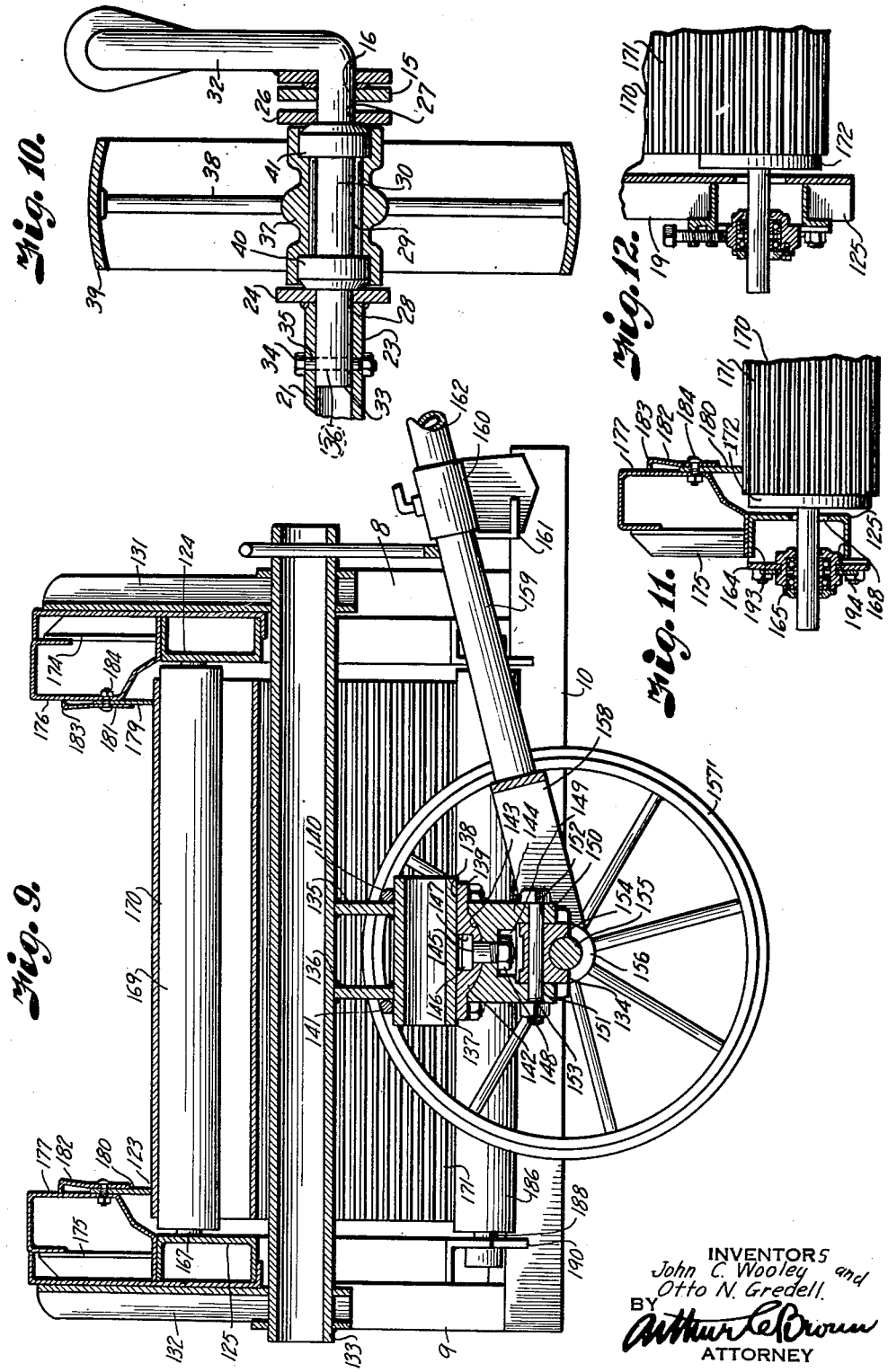
INVENTORS
John C. Wooley and
Otto N. Gredell.
BY Arthur LeBrown
ATTORNEY

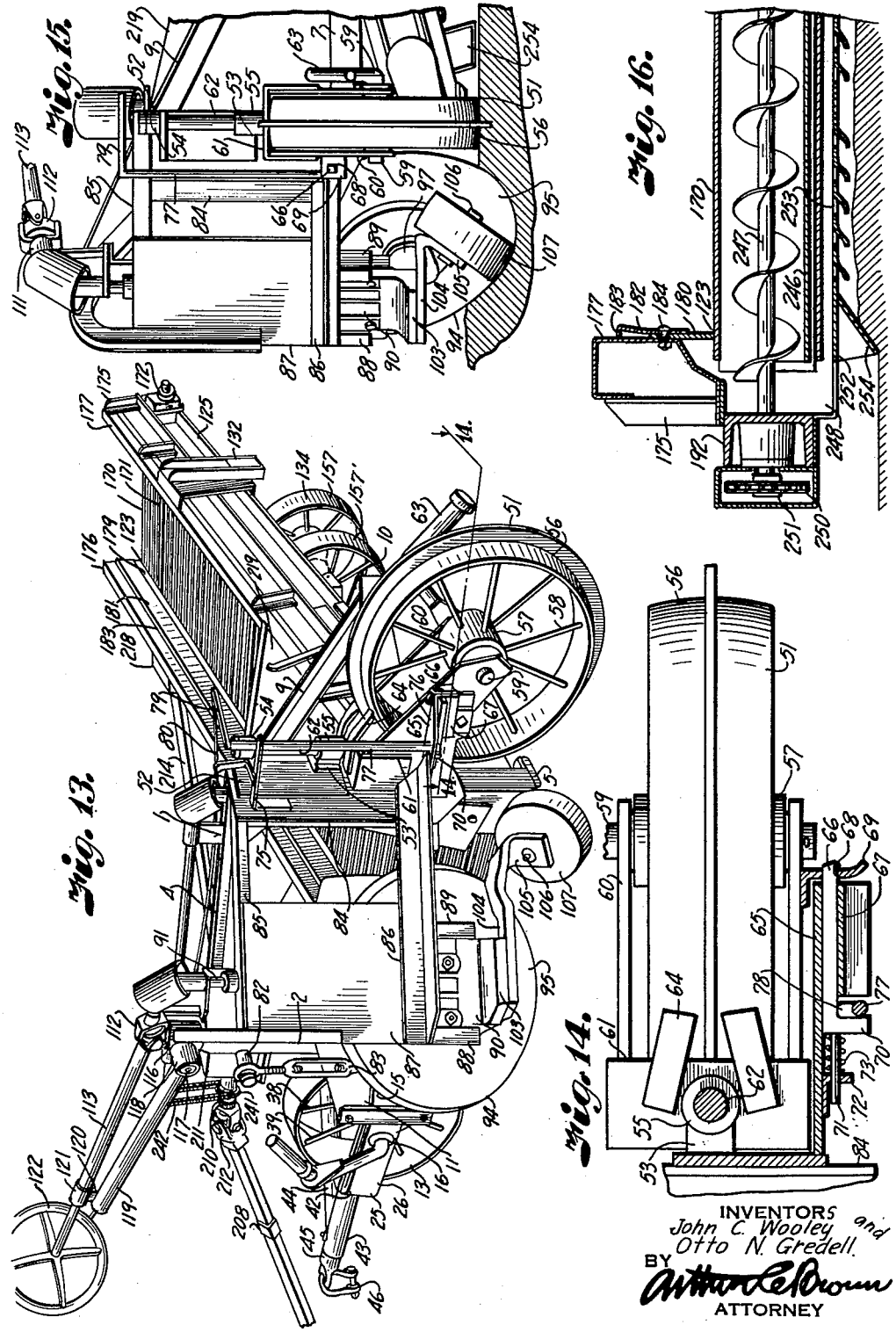

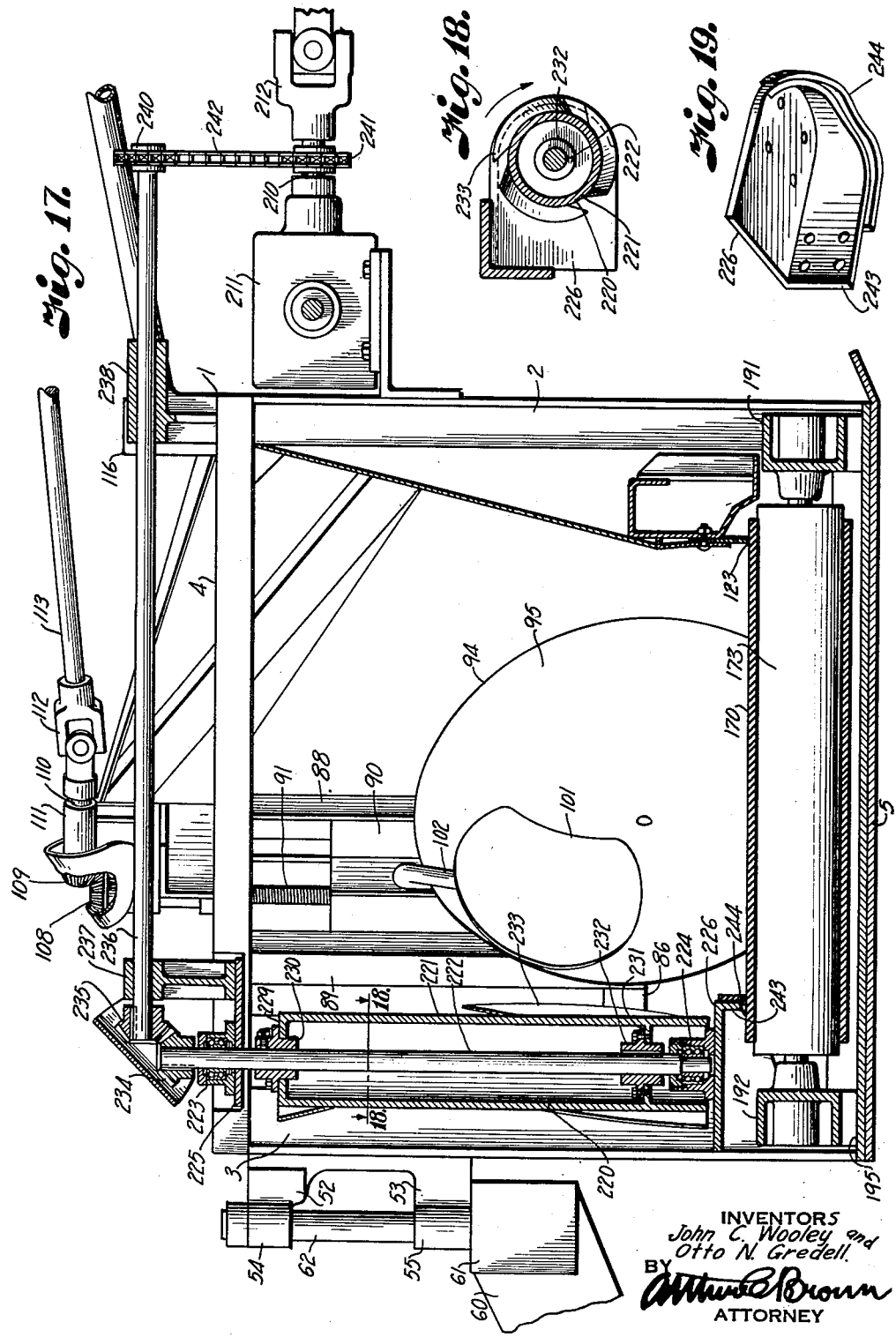

Patented Aug. 10, 1937

2,089,319

UNITED STATES PATENT OFFICE 2,089,319

GRADING MACHINE

John C. Wooley, Columbia, and Otto N. Gredell, Kansas City, Mo.; said Gredell assignor to Standard Steel Works, North Kansas City, Mo., a corporation of Missouri Application November 12, 1934, Serial No. 752,630

12 Claims. (Cl. 37—110)

This invention relates to grading machines and more particularly to a machine for building and maintaining terraces in the prevention of soil erosion of farm lands and the like, and has for its principal object to provide a machine of this character which is of simple, inexpensive construction and within the means of the average farmer.

Other important objects of the invention are to provide for economy in operation, to provide a machine of light draft so that it can be operated by an ordinary farm tractor, to provide for accurate work under control of the tractor operator, to prevent clogging of the soil handling mechanism through accumulation of clods, weeds and the like, to provide for uniform distribution of the terracing soil, and to provide a convertible wheel mounting for transporting the machine from one field of operation to another.

In accomplishing these and other objects of the invention, as hereinafter pointed out, we have provided improved details of structure, the preferred form of which is illustrated in the accompanying drawings, wherein:

Fig. 2 is a similar view of the machine showing the wheels in transposed position to permit transport of the machine from one field to another.

Fig. 3 is a plan view of the machine as shown in Fig. 1, particularly illustrating its attachment to the draw bar and power take off of a tractor.

Fig. 4 is a transverse vertical section through the machine, particularly illustrating the carrier construction which conveys the soil turned up by the plough disk for deposit on the terrace.

Fig. 5 is a vertical section through the plough disk mounting.

Fig. 6 is a horizontal section on the line 6—6, Fig. 5.

Fig. 7 is a side elevational view of the plough end of the carrier, particularly illustrating the mechanism for adjusting the carrier belt.

Fig. 8 is a horizontal section through the plough end of the carrier on the line 8—8, Fig. 7.

Fig. 9 is an enlarged vertical cross section through the opposite end of the carrier, particularly illustrating the mounting of the carrier supporting truck.

Fig. 10 is a vertical section through the main wheel, particularly illustrating the axle construction, whereby the wheel is made convertible for transport purposes.

Fig. 11 is a detail section through one side of the carrier frame, particularly illustrating the mounting of one end of the head pulley.

Fig. 12 is a similar view of the bearing, particularly illustrating the method of aligning the edges of the belt for movement in planes parallel to the side frame members of the carrier.

Fig. 13 is a perspective view of the rear side of the machine, particularly illustrating the caster mounting of the rear wheel as well as the mounting of the furrow wheel, which retains the machine in parallel relation to the terrace under construction.

Fig. 14 is a horizontal section through the caster mounting on the line 14—14, Fig. 13, particularly illustrating the latch for preventing castering of the wheel.

Fig. 15 is a fragmentary view of the rear portion of the machine, particularly illustrating the functioning of the furrow wheel.

Fig. 16 is a detail section through the lower end of the carrier, illustrating the screw for carrying off dirt that may tend to collect on the surface of the lower or tail pulley.

Fig. 17 is an enlarged vertical section through the machine on the line 17—17, Fig. 3, particularly illustrating the rotary deflector for preventing clogging and for diverting soil turned up by the plough disk onto the central portion of the carrier belt.

Fig. 18 is a detail section through the rotary deflector on the line 18—18, Fig. 17.

Fig. 19 is a detail perspective view of the bracket which carries the bearing mounting the lower end of the rotary deflector.

Figure 1:
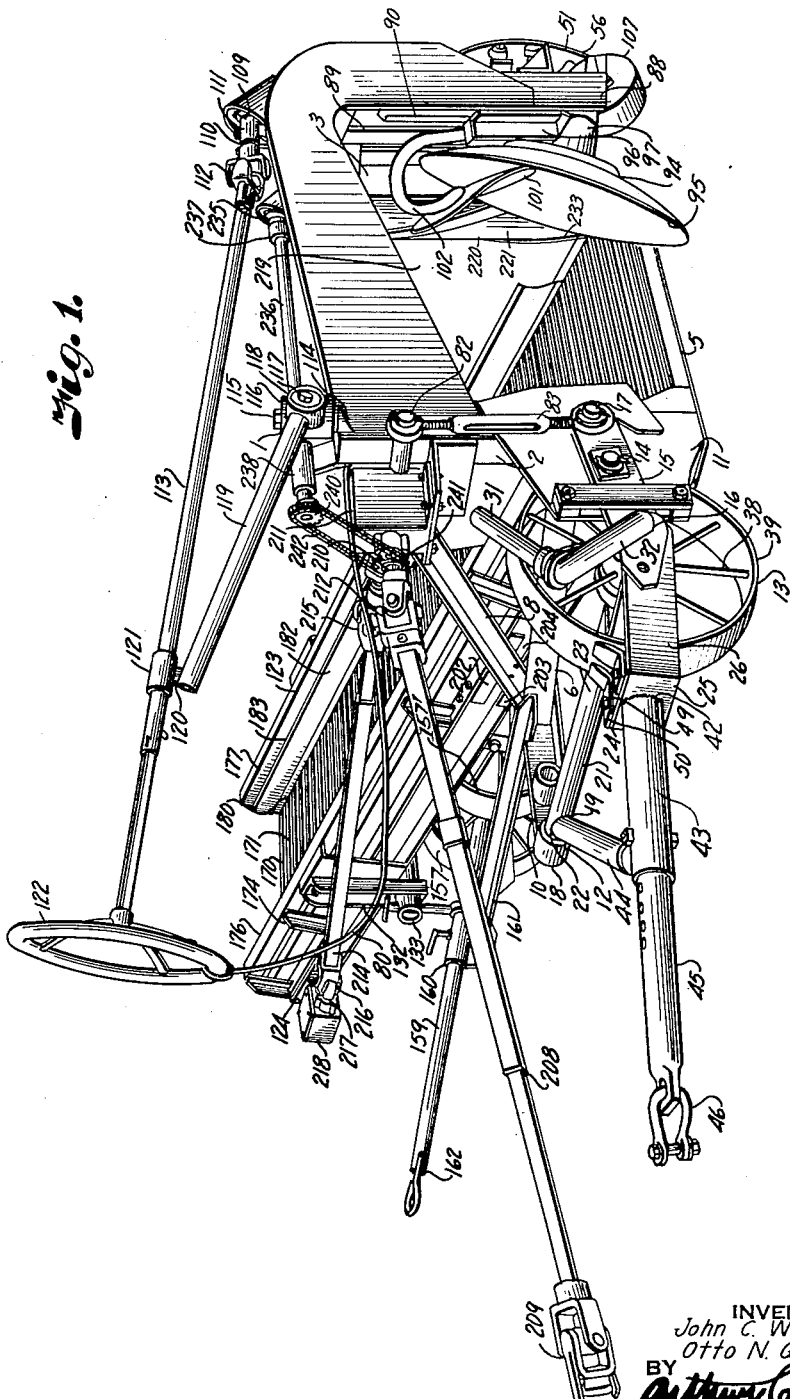
Fig. 1 is a perspective view of a terracing machine constructed in accordance with the present invention.

Referring more in detail to the drawings:

1 designates the main frame of a machine including spaced vertical angle members 2 and 3 connected at their upper ends by a horizontally arranged channel 4 and at their lower ends by a plate 5. Extending laterally from the vertical angle members 2 and 3 are arms 6 and 7 which are braced from the upper ends of the vertical angles 2 and 3 by angles 8 and 9 to mount a longitudinal angle 10 extending in spaced parallel relation with the plate 5, but at a higher elevation, as best illustrated in Fig. 4. Fixed to a side flange of the vertical angle member 2 is a forwardly projecting plate 11 that cooperates with the forward end 12 of the longitudinal angle 10 to mount the main wheel 13 that is located substantially in the plane of the vertical angles 2 and 3, as now to be described.

Extending outwardly from the side of the plate 11 is a stud 14 on which is pivotally mounted a lever arm 15 having a bearing opening 16 in its forward end and a laterally extending stud 17 at its rear end projecting from the side thereof opposite the plate 11. Mounted on the outer end 12 of the longitudinal angle 10 in substantial alignment with the bearing opening in the lever arm 15 is a bearing 18 which cooperates with the bearing opening 16 to mount the main wheel supporting frame 19.

The frame 19 includes a tubular member 21 having one end 22 loosely rotatable in the bearing 18 and having its opposite end 23 welded to one arm 24 of a yoke member 25.

The yoke member 25 has its other arm 26 located adjacent the forward end of the lever arm 15 and has a bearing opening 27 therein aligning with the opening 16 and with an opening 28 in the other arm 24 to mount a wheel axle 29. The axle includes wheel spindle portions 30 and 31 arranged at right angles to each other and connected by an intermediate bar portion 32 so that one of the spindle portions is located in a plane offset upwardly of the plane of the other spindle portion, as best illustrated in Figs. 1 and 10. When the machine is in use for terracing purposes, the spindle portion 30 is projected through the openings 16, 27, and 28 so that the end 33 thereof opposite the bar portion 32 is extended within the open end of the tubular member 21 for retention therein by a bolt 34 projecting through openings 35 in the tubular member and through an aligning opening 36 in the spindle portion.

The main wheel 13 includes a hub 37 that is connected by spokes 38 with a slightly crowned rim 39. The hub 37 carries thrust washers 40 and 41 that are mounted on the spindle 30 and retained between the arms 24 and 26.

Fixed to the bar portion 42 of the yoke is a draft bar 43 that is braced from the end 22 of the tubular member 21 by a tubular brace 44 to rigidly support the tubular member 21 at right angles to the direction of travel of the vehicle when draft is applied to the bar 43.

The forward end of the bar 43 terminates in a tongue 45 carrying a clevis 46 that is adapted to be connected with the draw bar 47 of a tractor 48, as best illustrated in Fig. 3. Mounted on the yoke member 25 and engaging the periphery of the wheel rim are scraper members 49 and 50 to remove dirt accumulating on the face of the wheel.

Mounted on the vertical angle 3 of the frame 1 in alignment with the track of the main wheel is a caster wheel 51 arranged for supporting the rear end of the machine as now to be described.

Fixed to the angle 3 and extending rearwardly therefrom are vertically spaced laterally projecting arms 52 and 53 which carry bearings 54 and 55 for pivotally mounting the caster wheel. The caster wheel 51 includes a flanged rim 56 and a hub 57 connected therewith by spokes 58. The hub of the wheel is rotatably mounted on an axle 59 similar to the axle previously described and has a wheel bearing carried between the forked end 60 of a caster yoke 61 that is provided with a shank 62 rotatably mounted in the bearings 54 and 55, the caster yoke being provided with a horizontal bar for engaging the lower end of the bottom bearing, as shown in Fig. 13. The axle also includes a wheel bearing portion 63 for use when the machine is to be moved. The yoke is provided with scrapers 64 operating on the rim of the wheel at opposite sides of the flanged rim 56 to remove soil that may tend to collect thereon.

Fixed to the angle member 3 and projecting rearwardly therefrom at a point above the horizontal axis of the wheel is an angle arm 65 for mounting a latch bar 66. The latch bar 66 is slidably mounted in a guide 67 and has its outer end projecting therethrough for engagement in an opening 68 of an ear 69 projecting from the side of the yoke arm 60. The opposite end of the bar carries a laterally extending head 70 from which projects a guide pin 71 that is slidably mounted in the lug 72 fixed to the depending flange of the angle arm. Sleeved over the guide pin and having ends bearing against the head 70 and lug 72 is a coil spring 73 to normally retain the projecting end of the bar in engagement with the ear 69. It is thus apparent that when the latch bar is engaged with the ear 69, the wheel is locked against castering so that it cooperates with the main wheel in supporting the carrier at right angles to the direction of travel of the machine, as hereinafter described.

When the wheel is released to permit castering, as when turning a corner, the turning radius of the wheel is limited by the arm 65 in one direction and by a V shaped brace 74 carried on the lateral arm 7 of the frame.

In order to release the latch bar to permit castering of the wheel when turning corners of the field, the upper end of the angle 3 carries a bracket arm 75 cooperating with the horizontal flange 76 of the angle arm 65 to rotatably mount the ends of a vertical rod 77 having a laterally extending foot portion 78 on its lower end to engage against the head 70 of the latch bar, as best shown in Fig. 14.

The opposite end of the rod carries a laterally projecting arm 79 that is connected with an end of a flexible cable 80 having its opposite end attached to a part of the machine or tractor in convenient reach of the operator.

In order to adjustably support the frame of the machine to space the bar 5 above the surface of the ground, the stud 17 on the lever arm 15 is connected to a similar stud 82 projecting from the upper end of the angle bar 2 by means of a turnbuckle 83. It is thus apparent that when the turnbuckle is actuated to shorten the spacing between the studs 17 and 82, the wheel carrying end of the lever arm will be rocked downwardly to cause raising of the frame and should the turnbuckle be lengthened to increase the spacing, the lever arm will be rocked in the opposite direction to lower the frame.

Fixed to the rear angle member 3 by means of a plate 84 are upper and lower bars 85 and 86 having their outer ends extending forwardly in angular relation to the horizontal channel 4. The outer ends of the bars are connected by a plate 87 having vertical, laterally spaced, channel shaped guides 88 and 89 on the front face thereof for slidably mounting a cross head 90 that is adjustably retained in the guides by means of a threaded shaft 91. The upper end of the shaft is rotatably mounted in the bar 85 while its lower end is rotatably mounted in a yoke shaped bearing 92 that is formed as a part of the cross head 90.

Mounted in the yoke shaped bearing is an internally threaded nut 93 threadedly engaging the shaft 91 so that when the shaft is rotated, the cross head is moved vertically along the guides to raise and lower the plough 94, now to be described.

The plough in the illustrated instance comprises a concavo-convex disk 95 arranged with its axis extending at an angle to the forward travel of the machine to throw the dirt laterally across the bar 5 onto a carrier hereinafter described. To mount the disk on the cross head, the cross head carries a bracket 96 having a depending portion 97 projecting angularly from the inner face of the cross head and which is provided with bearing races 98 and 99 for rotatably mounting the spindle 100 of the plough disk.

It is thus apparent that due to the angular support of the plough relatively to the travel of the machine, the lower edge thereof will cut a furrow and turn up the soil on the face of the disk as the machine is moved across the field. Forward travel of the machine causes rotation of the disk so that the soil is continually moved off the face of the disk onto the carrier above mentioned and later described. To assist in removal of the soil from the inner concave side of the disk, the disk is provided with a scraper 101 that is supported from the cross head by a goose neck bracket 102.

With the construction thus far described, the angular relation of the plough disk would tend to cause the machine to be diverted from its direction of travel and we, therefore, provide the cross head with a rearwardly and laterally extending bracket 103 for mounting an arm 104 having a depending end 105 arranged in a plane at an angle reverse to the plane of the plough disk.

The depending end 105 carries a spindle 106 arranged reversely to the spindle of the plough disk to mount a roller 107 adapted to operate in the furrow as best illustrated in Fig. 15, the roller operating in inclined position against the side of the furrow to resist tendency of the plough disk to divert the machine from its forward line of travel. The roller, being guided by the furrow, retains the wheels 13 and 51 moving in a plane parallel thereto which is also parallel to the direction of the terrace under construction.

In order to actuate the screw 91 to raise and lower the plough, the upper end of the screw carries a bevelled gear 108 that meshes with a bevelled gear 109 on a stub shaft 110 rotatably mounted in a bearing bracket 111 on the channel 4. Coupled to the stub shaft 110 by a universal joint 112 is a telescoping shaft 113 projecting forwardly of the machine. To adjustably brace the forward end of the shaft 113, the channel 4 carries a bracket 114 having an upright stud 115 on which is pivoted a sleeve member 116 that is provided with a laterally extending boss 117. Pivotally mounted on the boss 117 is a sleeve 118 carrying a forwardly and upwardly extending brace arm 119 mounting a bracket 120 having a sleeve shaped guide 121 slidably engaging the free end of the telescoping shaft 113 so that a hand wheel 122 thereon is supported in convenient reach of the operator of the tractor as illustrated in Fig. 3.

In order to elevate the soil turned up by the plough for deposit on the terrace, the frame 1 also mounts a carrier 123 including spaced channels 124 and 125 extending laterally of the main frame and inclined upwardly across the angle 10. The channels are retained in spaced parallel relation throughout the length thereof by a series of tubular spacers 127, 128 and 129 fixed to the webs of the channels by brackets 130.

Depending from the projecting ends of the channels are channel shaped arms 131 and 132 carrying a tubular cross member 133 having its ends projecting through the web of the channel and welded thereto for mounting a truck 134 as now to be described.

Secured intermediate the ends of the tubular member are depending plates 135 and 136 carrying a tubular bearing section 137 extending in parallel relation therewith and which engages in a concave seat 138 of a block 139, the block 139 being secured to the tubular section by means of U-bolts 140 and 141. The block 139 is provided on its lower face with a spherical boss 142 that engages in a similarly shaped seat 143 of a pivot block 144.

The pivot block 144 is secured to the block 139 by a king bolt 145 extending centrally through the blocks and having its head 146 seated in a recess 147 of the block 139 and its nut 148 mounted in a similar recess 149 in the lower face of the block 144.

Depending from the lower block are spaced ears 150 and 151 having aligning openings 152 with their axes extending parallel to the forward travel of the machine to pivotally mount a horizontal pivot bolt 153 carrying the axle block 154 to which the axle 155 of the truck is attached by means of U-bolts 156 as best shown in Fig. 9. The axle 155 carries wheels 157 and 157' rotatably mounted on its opposite ends. Pivotally mounted on the axle intermediate the wheels is a yoke 158 carrying a reach rod 159 having its forward end removably engaged in a bracket 160 that is mounted on an angle arm 161 extending laterally from the forward end of the angle 10 previously described and as best shown in Fig. 1. The reach rod extends forwardly through the clamping bracket to provide a tongue portion 162 by which it may be secured to a vehicle for trailing the machine when it is taken from one field of operation to another, as later described.

Mounted alongside the channels 124 and 125 at the outer sides thereof is a series of brackets 164 carrying roller bearing sets 165 as best shown in Fig. 11. The bearing sets 165 mount the ends of roller shafts 167 that project through openings 168 in the webs of the channels and carry rollers 169 of suitable length to cooperate with end pulleys 172 and 173 for supporting the carrier belt 170. The carrier belt extends across the space between the side channels and is preferably constructed of a single web having transverse ribs 171 to cause the soil to cling thereon when it is moved from the plough up the incline for discharge onto the terrace.

The set of bearings mounting one end of the uppermost pulley 172 is adjustably mounted in its brackets to position the end roller in parallel relation so that the belt is adjusted to travel in a straight path relatively to the webs of the channels.

Extending upwardly from the belt and supported on the upper flanges of the channels 124 and 125 are angles 174 and 175 carrying side boards 176 and 177 on their inner sides to mount guard strips 179 and 180 that overlap the side edges of the belt to prevent the soil from falling therefrom, as best illustrated in Fig. 9. The guard straps are preferably formed of flexible material such as rubber or the like so that their lower ends can ride in contact with the face of the belt. The strips are retained on the brackets by clamping plates 181 and 182 and have their lower edges overlapping the upper edges of the strips and their upper edges provided with inturned flanges 183 to tension the lower edges thereof when the fastening bolts 184 are projected through the retaining strips and plates as shown in Fig. 9.

The upper run of the belt extends over the series of rollers 169 for support thereby while the lower run of the belt is supported from sagging by means of rollers 185 and 186 having their shafts 187 and 188 rotatably mounted in ears 189 and 190 projecting from the lower flange of the channels 124 and 125.

In order to tension the belt, the bearings carrying the pulley 173 at the plough end of the carrier are mounted in extension arms 191 and 192 that are adjustably slidable between the flanges 193 and 194 of the channels as best illustrated in Fig. 7, the extensions being attached to a plate 195 fixed to the plate 5. The lower ends of the channels are fixed to the extensions by means of clamping plates 196 and 196' projecting from the flanges thereof and moved in clamping engagement by bolts 197 extending across the outer face of the extensions as shown in Figs. 7 and 8. To adjust tension of the belt, the channels carry a cross shaft 198 provided with pinion gears 199 meshing with racks 200 on the extensions, as shown in Figs. 7 and 8. In order to permit movement of the channels relatively to the extensions, the web portions thereof are provided with slots 201 through which the shaft 198 is extended.

In order to retain the channels in sliding support on the frame, the flanges thereof adjacent the braces 8 and 9 are provided with pairs of guide bars 202 and 203 spaced apart to form a guide way 204 for blocks 205 that are fixed to the braces by means of the bolts 206. It is thus apparent that when the adjustment is made, the channels can slide on the blocks 205, but they are retained against vertical movement thereby, as shown in Fig. 7.

To operate the belt, the shaft for the end pulley 172 is actuated from the power take off 207 of the tractor.

This is accomplished through a telescoping shaft 208 connected to the power take off by a universal joint 209 and to a shaft 210 of a gear reduction transmission indicated by the housing 211, the telescoping shaft 208 being connected to the shaft 210 by a universal joint 212. The power delivery shaft 213 of the transmission is connected to a telescoping shaft 214 by means of a universal joint 215, the opposite end of the shaft 214 being connected by a universal joint 216 to a stub shaft 217 that is rotatable in a gear box 218 mounting gears (not shown) which connect the stub shaft with the shaft of the pulley 172. The universal connections and telescoping arrangement of shafts permit relative movement between the tractor and terracing machine and relative movement between the frame 1 and the carrier 123.

In order to prevent the dirt that is discharged from the plough being thrown over the top of the side board 177, the lower end thereof terminates in a guard plate 219 that extends the full height of the channel 3.

Since the dirt is thrown against the plate 219 and tends to pile up on one side of the belt, we provide a rotary deflector 220 which extends in parallel relation with the angle 3.

The deflector includes a cylinder 221 mounted on an axle shaft 222 having its ends journaled in bearings 223 and 224 located respectively on a plate 225 projecting from the side of the channel 4 and on a bracket 226 projecting from the lower end of the angle 3, as shown in Fig. 17.

The top of the cylinder is closed by an end plate 229 that is provided with a hub 230 by which the cylinder is secured to the shaft 222. The lower end of the cylinder over the bearing 224 carries an inset flange 231 mounting a hub 232 that is keyed to the lower end of the shaft 222. The end of the cylinder covering the bearing thus forms a skirt to prevent entrance of dirt into the bearing.

The periphery of the tubular body is provided with a series of spiral plates 233 that extend from the top thereof substantially one-third of the way around its circumference to engage the dirt and throw it down upon the center of the belt incidental to rotation of the deflector as now described.

To drive the deflector, the axle shaft 222 projects through the bearing 223 and is provided with a bevelled gear 234 meshing with a bevelled gear 235 on a counter shaft 236, the counter shaft 236 being mounted in bearings 237 and 238 carried by the plate 225 and by the opposite end of the channel 4. The counter shaft projects over the transmission shaft 210 and carries a sprocket 240 aligning with a sprocket 241 thereon, and operating over the respective sprockets is a chain belt 242.

The bracket 226 has a depending flange 243 which carries a flexible strip 244 forming a continuation of the flexible guard strip on that side of the conveyor belt to prevent the dirt from being thrown off the edge of the belt.

Dirt and dust that does sift by the edge of the belt and is caught on the lower run thereof collects on the lower pulley and unless removed therefrom tends to clog and stop operation of the belt. To prevent this we provide a scraper 245 that is carried on the edge of a concave trough 246 extending transversely between the channel extension members 191 and 192 and which mounts a spiral screw conveyor 247 that moves the dirt discharged from the scraper through an opening 248 between the end of the trough and one of the extensions, as best shown in Fig. 16. The spiral screw is operated from a sprocket 249 on the lower pulley shaft by means of a chain 250 operating thereover and over a sprocket 251 on the shaft of the conveyor as best illustrated in Figs. 7 and 16.

In order to protect the lower run of the belt at the plough end thereof, the channels 124 and 125 carry a guard plate 252, and to allow dirt that drops from the belt to pass therethrough, the guard plate carries a series of louvres 253 arranged with their open sides leading to the rear of the machine. The dirt outlet opening for the screw conveyor is also protected by a shield 254 to prevent weeds and the like from interfering with egress of the dirt.

In operating a machine constructed and assembled as described, the clevis 46 is attached to the draw bar 47 of the tractor 48 and the universal 209 is attached to the power take off connection 207 of the tractor. The telescoping shaft 113 is then adjusted so that the hand wheel 122 is within easy reach of the operator of the tractor.

The main wheel is then adjusted so as to support the lower end of the carrier in proper relation to the ground level, the turnbuckle 83 being rotated to adjust the position of the lever arm 15, as previously described.

The machine is then drawn along the terrace to be constructed.

The operator lowers the plough into the soil by rotating the hand wheel 12 so that rotation of the plough upon forward movement of the machine causes the soil to move upwardly on the side of the plough for discharge onto the belt 171 which is being operated by tractor power through the telescoping shafts 208 and 214.

Simultaneously with actuation of the conveyor belt, the deflector 220 is operated by the shaft 236 to prevent clogging and to deflect the soil onto the center part of the belt so that the belt is loaded evenly. After being deposited on the belt, the soil is carried thereby and discharged off its upper end, onto the terrace under construction.

When the operator reaches the end of the terrace and desires to turn the machine, he will operate the cable 80 to release the latch holding the caster wheel in alignment with the main wheel 13.

The machine can then be turned for travel down the opposite side of the terrace. After the machine is turned the operator releases the cable 80 to permit the spring 73 to move the latch 68 into return engagement with the ear 69 to hold the caster wheel in rigid condition relative to the main wheel to prevent side draft.

When it is desired to move the machine from one field of operation to another, the axle spindle 30 is withdrawn to permit removal of the wheel. This is accomplished by removing the bolt 34 that retains the inner end of the axle in engagement with the tubular brace 21. The spindle 30 of the axle is then reinserted through the yoke 24 and into the open end of the tubular brace 21, but when reinserted it is turned at exactly 180° from its original position. The bolt 34 is then replaced. This locates the spindle 31 below the spindle 30 and at right angles thereto as shown in Fig. 2, after which the wheel is reapplied to the spindle 31.

The caster wheel axle is similarly changed so that the caster wheel is positioned in parallel spaced relation with the main wheel.

The reach bar is then removed by disengaging the clamp 160 and the truck is turned at an angle of 90° in the direction of the carrier. The tongue 162 is then in position to be secured to a draft vehicle.

When the machine is moved from one field to another, the plough will be raised to its highest position by operating the hand wheel 122, after which the wheel shaft and main draft tongue may be moved for support upon the machine, as illustrated in Fig. 2.

From the foregoing, it is apparent that we have provided a simple terracing machine that can be produced at a cost which is within the means of the average farmer so that he may maintain his fields against soil erosion and prevent destruction of his crops.

What we claim and desire to secure by Letters Patent is:

1. A machine of the character described including a frame, an excavator carried by the frame, a carrier, means supporting the carrier on the frame in receiving relation to the excavator, a rotary deflector including a cylinder mounted on the frame above the carrier and in line with excavated material discharged from the excavator, means for rotating the deflector, and spiral blades on the cylinder arranged substantially tangential to the surface of the cylinder to discharge the excavated material onto the carrier.

2. A machine of the character described including a main frame, a wheel supporting the front of the frame, a caster wheel supporting the rear of the frame, a plough member carried by the frame laterally of said wheels, a carrier on the frame in receiving relation to the plough member, convertible axles for said wheels to change the position thereof, a truck cooperating with the frame to support the carrier, means rotatably mounting the truck on the frame to conform to change of position of said wheels, a reach bar on the truck for connection to the frame, and a tongue on the reach bar for trailing the machine from a draft vehicle when the wheels are changed.

3. A machine of the character described including a main frame, wheels supporting the main frame, a plough frame projecting laterally of the main frame and located in a plane at an angle relatively to forward travel of the machine, a plough member carried by the plough frame laterally of said wheels, a carrier on the main frame in receiving relation to the plough member, and a furrow wheel carried with the plough member on said plough frame and having inclined support relatively to the first named wheels for retaining said wheels in line with the furrow made by the plough member.

4. A machine of the character described including a frame, an excavator carried by the frame, an inclined furrow wheel connected with the excavator for traction in the furrow made by said excavator, a carrier, means supporting the carrier on the frame in receiving relation to the excavator, and means for simultaneously adjusting the excavator and furrow wheel relatively to the carrier.

5. In a machine of the character described, a frame, wheels supporting the frame, a carrier on the frame, a pair of guide members on the frame at an end of the carrier, a cross head mounted between the guide members, a plough member having rigid support on the cross head, a screw shaft rotatably mounted on the frame and having threaded connection with the cross head, and means for rotating said shaft to raise and lower the cross head to adjust the depth of the plough member relatively to said end of the carrier.

6. In a machine of the character described, a frame, wheels supporting the frame, a carrier on the frame, a pair of guide members on the frame at an end of the carrier, a cross head mounted between the guide members, a plough member carried by the cross head, a screw shaft rotatably mounted on the frame and having threaded connection with the cross head, means for rotating said shaft to raise and lower the cross head to adjust the depth of the plough member relatively to said end of the carrier, and a furrow wheel carried by the cross head.

7. In a machine of the character described, a frame, a carrier supported on the frame for moving excavated material, wheels supporting the frame at opposite sides of one end of the carrier, a plough member for excavating and discharging material onto the carrier, a plough frame extending in an outwardly and forwardly direction from the portion of the main frame carried by said wheels, means adjustably supporting the plough member on the plough frame, and an inclined furrow wheel carried with the plough member on the plough frame for retaining the wheels in parallel alignment with the furrow made by said plough member.

8. In a machine of the character described, a frame, a carrier supported on the frame for moving excavated material, wheels supporting the frame at opposite sides of one end of the carrier, spaced guides carried by the frame and offset laterally from the line of traction for said wheels on the side of the wheels opposite said carrier, a cross head mounted in the guides, a plough member carried by the cross head for excavating material and discharging the material onto the carrier, an inclined furrow wheel carried by the cross head, and means for raising and lowering the cross head in the guides to adjust depth of the plough member relatively to said lower end of the carrier.

9. In a machine of the character described, a frame, a carrier supported on the frame for moving excavated material, wheels supporting the frame at opposite sides of one end of the carrier, spaced guides carried by the frame and offset laterally from the line of traction for said wheels on the side of the wheels opposite said carrier, a cross head mounted in the guides, a plough member carried by the cross head for excavating material and discharging the material onto the carrier, an inclined furrow wheel carried by the guides, means for raising and lowering the cross head in the guides to adjust depth of the plough member relatively to said lower end of the carrier, caster means for mounting one of said frame supporting wheels, and means for selectively locking said caster means to retain the wheel in tracking relation with the other of said wheels against thrust imparted by said furrow wheel.

10. In a machine of the character described, a main frame, a carrier supported transversely of the frame for moving excavated material, wheels supporting the frame at opposite sides of the carrier, spaced guides carried by the frame and offset laterally from the line of traction for said wheels on the side of the wheels opposite the carrier, a cross head mounted in the guides, a plough disk rotatably mounted on the cross head for excavating material and discharging the material onto the carrier, a furrow wheel carried by the cross head and operable in the furrow formed by the plough disk for guidingly retaining the frame supporting wheels in parallel alignment with the furrow, and means for raising and lowering the cross head to adjust depth of the furrow.

11. In a machine of the character described, a main frame, a carrier supported transversely of the frame for moving excavated material, wheels supporting the frame at opposite sides of the carrier, spaced guides carried by the frame and offset laterally from the line of traction for said wheels on the side opposite the carrier, a cross head mounted in the guides, a spindle mounted on the cross head and rotatable on an axis inclined in the direction of one of said wheels, a plough disk carried by said spindle for excavating material and discharging the material on the carrier, and a furrow wheel rotatably carried by the cross head and having its axis of rotation extending at an angle opposite to the axis of rotation of the spindle to retain said wheels in parallel alignment with the furrow made by the plough disk.

12. In a machine of the character described, a main frame, a carrier supported on the main frame for moving excavated material, wheels supporting the main frame at opposite sides of one end of the carrier, spaced guides, means extending outwardly and forwardly from the main frame for supporting said guides at said wheels supported end of the carrier, a cross head mounted in the guides, a plough member carried by the cross head for excavating material and discharging the material into the carrier, and means for raising and lowering the cross head in the guides to adjust depth of the plough member relatively to the lower end of the carrier.

JOHN C. WOOLEY.
OTTO N. GREDELL.